Feb. 2, 1965 H. E. HOLLMANN 3,167,958
DEVICES FOR MINIMIZING THE EFFECTS OF FRICTION
Filed April 8, 1960 4 Sheets-Sheet 1
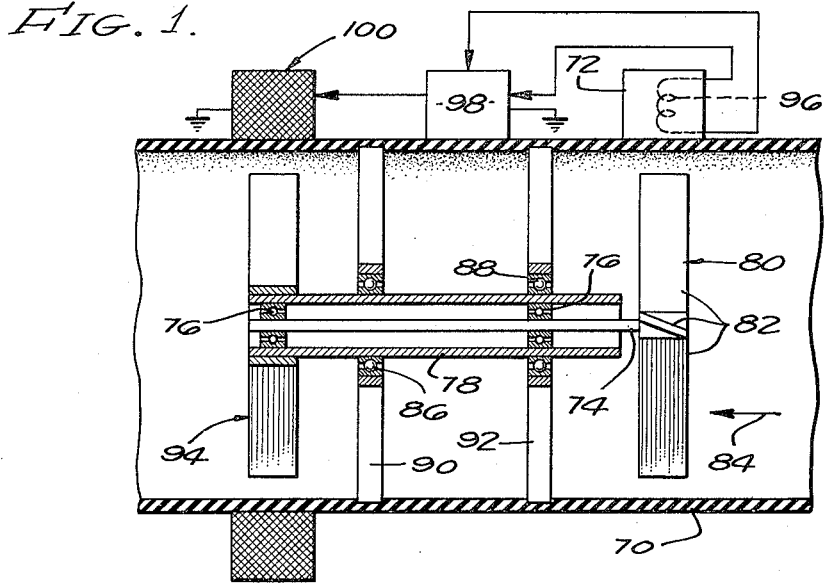
FIG. 1.
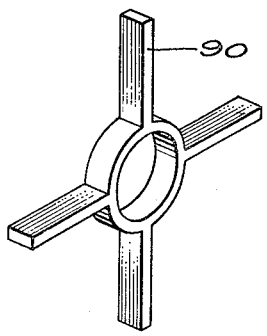
FIG. 2.
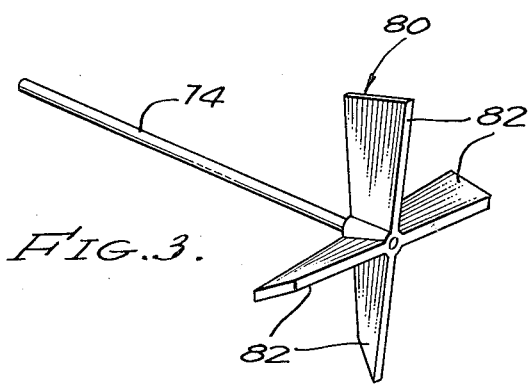
FIG. 3.
FIG. 4.
HANS E. HOLLMANN
INVENTOR.
BY
ATTORNEY

HANS E. HOLLMANN
INVENTOR.

BY Edward A. Kendrick
ATTORNEY

United States Patent Office 3,167,958
Patented Feb. 2, 1965

3,167,958
DEVICES FOR MINIMIZING THE EFFECTS
OF FRICTION
Hans E. Hollmann, Studio City, Calif., assignor to Dresser Industries, Inc., Dallas, Tex., a corporation of Delaware
Filed Apr. 8, 1960, Ser. No. 22,077
9 Claims. (Cl. 73—231)

This invention relates to means for reducing the effect of a bearing friction to a negligible value, and more particularly to devices utilizing a mechanical movement where friction is undesirable such as integrators of the inertia type which incorporate rotors mounted in bearings to which a torque is applied in proportion to a signal to be integrated.

This application is a continuation-in-part of copending application Serial No. 789,342 filed January 27, 1959, now abandoned, by Hans E. Hollmann for Frictionless Bearing, and the benefit of the filing date of said copending application is hereby claimed for this application.

Inertia type integrators of the prior art rely on the physical laws that angular acceleration is proportional to applied torque in accordance with the moment of inertia of the rotor about its axis, angular velocity is proportional to the integral of angular acceleration, and angular displacement is proportional to the integral of angular velocity or proportional to the double integral of angular acceleration. However, these integrators suffer from a serious error, which, to the present time, has not been dealt with except by the use of low friction bearings to support the rotor assembly. This error is, in fact, due to bearing friction because bearing friction always subtracts from the applied torque regardless of the direction in which it is applied.

A fan-blade type flowmeter, anemometer or otherwise, incorporating a fan-blade type rotor rotatably mounted in bearings is a typical example of an integrator. Such a flowmeter may register fan rate of rotation produced by fluid flow in an axial direction against the blades thereof as an indication of the rate of fluid flow. Total flow in a given area will be indicated by the total angular displacement or revolutions made by the blades. Ideally, for perfectly accurate measurement, the blades of this type of flowmeter should turn at a velocity exactly proportional to the fluid flow rate. However, as in the case of the above-mentioned inertia type integrators of the prior art, this is not possible with such prior art flowmeters because some energy must be derived from the fluid flow to overcome bearing friction.

The present invention overcomes the above-described and other disadvantages of the prior art by providing support means, first means movably carried on the support means, second means movably carried on the first means, third means to detect movement of the second means, and fourth means responsive to the output of the third means for moving the first means in a direction tending to reduce relative movement between the first and second means. All of the means may take any one of several forms. For example, an integrator may be constructed having fixed support means, a Selsyn receiver having a stator including a winding fixed to the support means and a hollow rotor with a winding thereon, outer bearing means between the fixed support means and the Selsyn receiver rotor, a Selsyn transmitter having a stator including a winding and a rotor with a winding thereon, inner bearing means inside the hollow rotor between the hollow rotor and the Selsyn transmitter rotor.

A flowmeter made in accordance with the invention may have a construction including fixed support means, a hollow cylinder outer bearing means to support the hollow cylinder rotatably from the support means, a shaft, inner bearing means to support the shaft rotatably inside the hollow cylinder, a first bladed member having a predetermined pitch fixed to the shaft in a position to rotate upon fluid flow in an axial direction thereagainst, a second bladed member fixed to the cylinder having a pitch from zero to less than that required to rotate it synchronously with the first bladed member upon the same axial fluid flow, the second bladed member having an equal, multiple or submultiple number of blades as that of the first bladed member, means on the support means at a first fixed point around the first bladed member to generate an output pulse when a blade of the first bladed member passes the first fixed point, and a coil on the support means at a second fixed point around the second bladed member connected to the pulse generator means for rotating the second bladed member in a manner similar to that in which a synchronous motor is driven.

From the foregoing, it will be apparent that all friction loss will be due to a lack of damping if none is provided because when the outer rotary means is "slaved" to the inner rotary means in accordance with the present invention, little or no movement takes place of the inner rotary means on the outer rotary means and bearing friction is therefore no longer a problem. It is true that in the case of the integrator, some torque is always required to create an angular displacement between the inner and outer rotary means to derive error signal based upon which a control voltage may be applied to a servo motor to drive the outer rotary means; however, if an amplifier having a relatively high gain is used to amplify a voltage proportional to the angular displacement and apply it to the servo motor, the torque required to produce the angular displacement therefore becomes negligible. Hence, in accordance with the invention, an unusually accurate integrator or flowmeter may be constructed which will operate substantially friction free and more satisfactorily than any integrator or flowmeter made in accordance with the teaching of the prior art.

The invention will be better understood when considered in connection with the following description.

In the accompanying drawings, which are to be regarded as merely illustrative:

FIG. 1 is a sectional view of a flowmeter made in accordance with the invention;

FIG. 2 is a perspective view of a stationary supporting spider employed in the flowmeter shown in FIG. 1;

FIG. 3 is a perspective view of inner rotary means employed in the flowmeter shown in FIG. 1;

FIG. 4 is a perspective view of outer rotary means employed in the flowmeter shown in FIG. 1;

Figure 5:
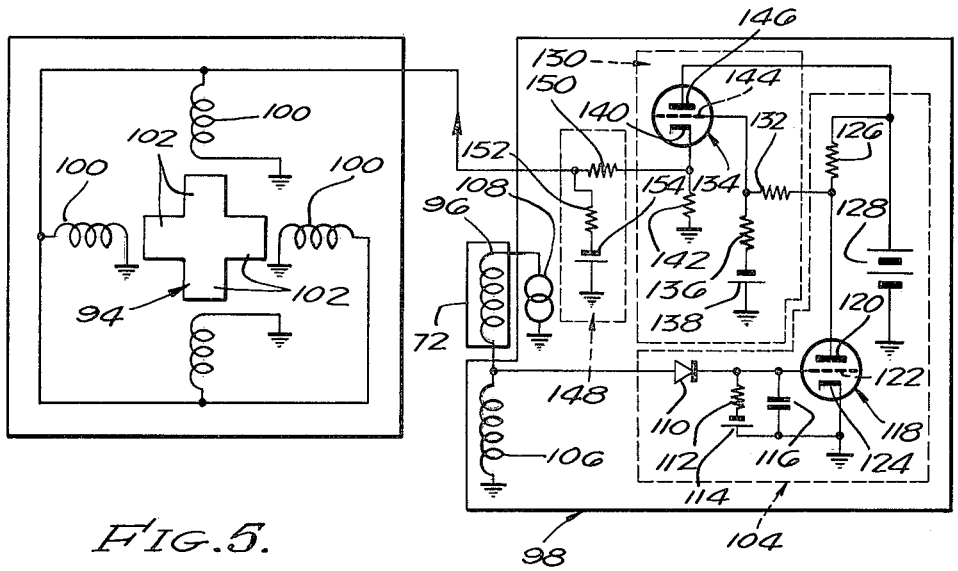
FIG. 5 is a schematic diagram of the apparatus shown in FIG. 1.

As stated previously, a flowmeter is a type of integrator. Although the invention may be used as an anemometer, one embodiment of the invention shown in FIG. 1 may be employed as a meter to produce an output signal proportional to a fluid flow through a conduit. A conduit is indicated at 70 in FIG. 1 which is made of a dielectric material because a particular type of detector means indicated at 72 is employed with this embodiment of the invention. Alternatively, conduit 70 may be made of any non-magnetic material as will be seen. The flowmeter shown in FIG. 1 incorporates an inner shaft 74 which is rotatably mounted in bearings 76 inside of an outer hollow cylindrical shaft 78. Bladed member 80 is fixed to inner shaft 74 having blades 82 with a predetermined pitch to cause fluid flow in a direction of an arrow 84 to rotate inner shaft 74 in a left-hand direction as viewed from the right in FIG. 1. Outer cylindrical shaft 78 is also rotatably mounted in bearings 86 and 88 carried in spiders 90 and 92 that are fixed in conduit 70. Both the spiders 90 and 92 are identical, one of which is shown in the perspective view of FIG. 2. A second bladed member 94 is fixed to the left end of cylindrical shaft 78. A perspective view of bladed member 80 on inner shaft 74 is indicated in FIG. 3. Both bladed member 94 and cylindrical shaft 78 are shown in FIG. 4. Bladed member 94 must have a predetermined pitch although it should have a pitch less than that of and in the same direction as that of blades 82 of bladed member 80 to cause the system to approach a "locking-in" speed similar to a synchronous motor having an "induction start."

Detector 72 may be simply a coil 96 if desired. Thus, it is contemplated that, at least if not all the material of blades 82 are made of a ferromagnetic material, at least the ends thereof will be so constructed. In this case, the inductance of coil 96 will increase when blades 82 pass in proximity thereto. This increase in inductance is measured by a control circuit 98 which impresses a voltage on a plurality of windings indicated generally at 100 to cause rotation of bladed member 94 and therefore shaft 78 substantially synchronously with bladed member 80. This means, as before, if outer shaft 78 is rotated at the same speed as inner shaft 74, no bearing friction loss will be imposed on the flowmeter in bearing 76 because no relative movement between inner shaft 74 and outer shaft 78 will exist. The manner in which control circuit 98 and windings 100 operate to synchronize rotation of outer shaft 98 with inner shaft 74 will be better understood when considered in connection with the schematic diagram of FIG. 5.

In FIG. 5, a bladed member is again indicated at 94. Bladed member 94 with windings 100 may have a construction similar to that of a synchronous motor although they may or may not be constructed in an identical manner, as desired. For example, the bladed member 94 or the ends of the blades 102 thereof may be made of a ferromagnetic material. If the construction were identical to that of a synchronous motor, generally bladed member 94 would be made of a plurality of permanent magnets, alternate blades 102 presenting north and south poles to windings 100. This is not necessary in accordance with the invention as will be explained.

As stated previously, inductive winding or coil 96 will change in impedance as blades 82 of member 80 pass adjacent thereto. Thus, this increase in inductance is detected by an amplifier indicated generally at 98. An alternating signal is impressed both on coil 96 and an inductor 106 by means of an alternating source of potential 108 connected serially therewith. The junction of inductors 96 and 106 is connected to the input amplifier 104. Amplifier 104 comprises simply a detector diode 110, a bias resistor and bias source 112 and 114 connected therefrom to ground, a triode 118 having an anode 120, a control grid 122, and a cathode 124. A smoothing capacitor 116 is connected from the output of diode 110 to ground. The cathode 124 of triode 118 also is connected to ground. The output of diode 110 is connected to the grid 122, and the anode 120 is connected to ground through an anode resistor 126 and a direct-current source of potential 128. The output of amplifier 104 is connected to a cathode follower circuit 130 from anode 120 through resistor 132 to a triode 134. The output of amplifier 104 is level shifted by means of a resistor 136 and a direct current source of potential 138. Triode 134 is provided with a cathode 140 connected through a cathode resistor 142 to ground, a control grid 144 connected to the mutual junction of resistors 132 and 136, and an anode 146 connected to direct-current source of potential 128. The output of cathode follower circuit 130 is connected to a level shifting circuit 148 including a resistor 150 connected from the cathode 140 of triode 134 to a resistor 152 that is connected to ground through a bias battery 154. The mutual junction of resistors 150 and 152 is then connected to the windings 100.

Figure 6:
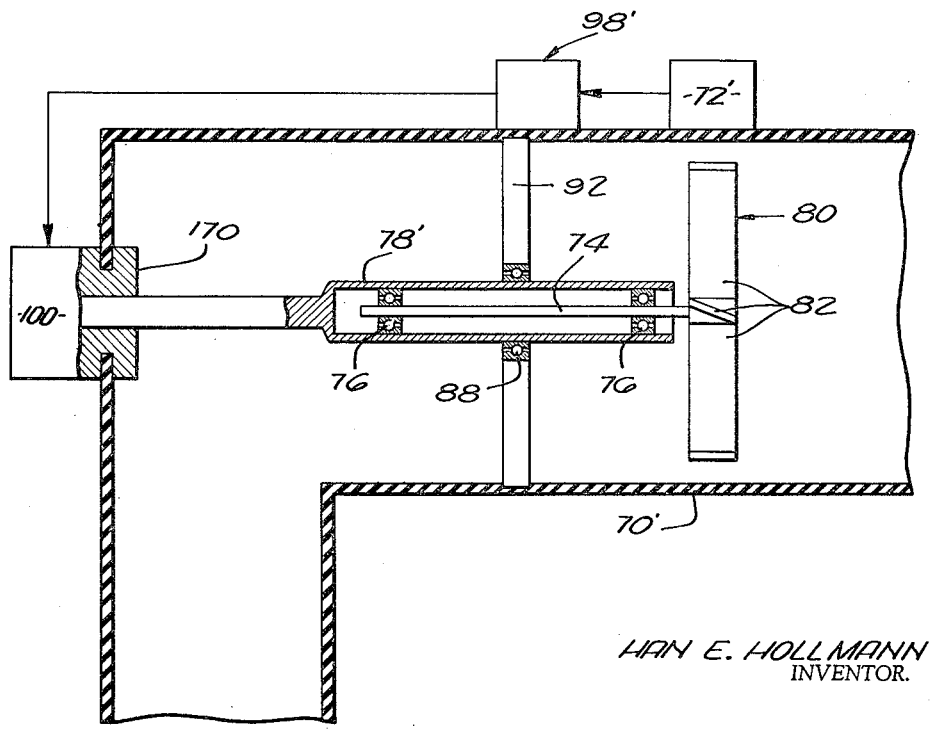
FIG. 6 is a sectional view of another embodiment of a flowmeter made in accordance with the invention.
Figure 7:
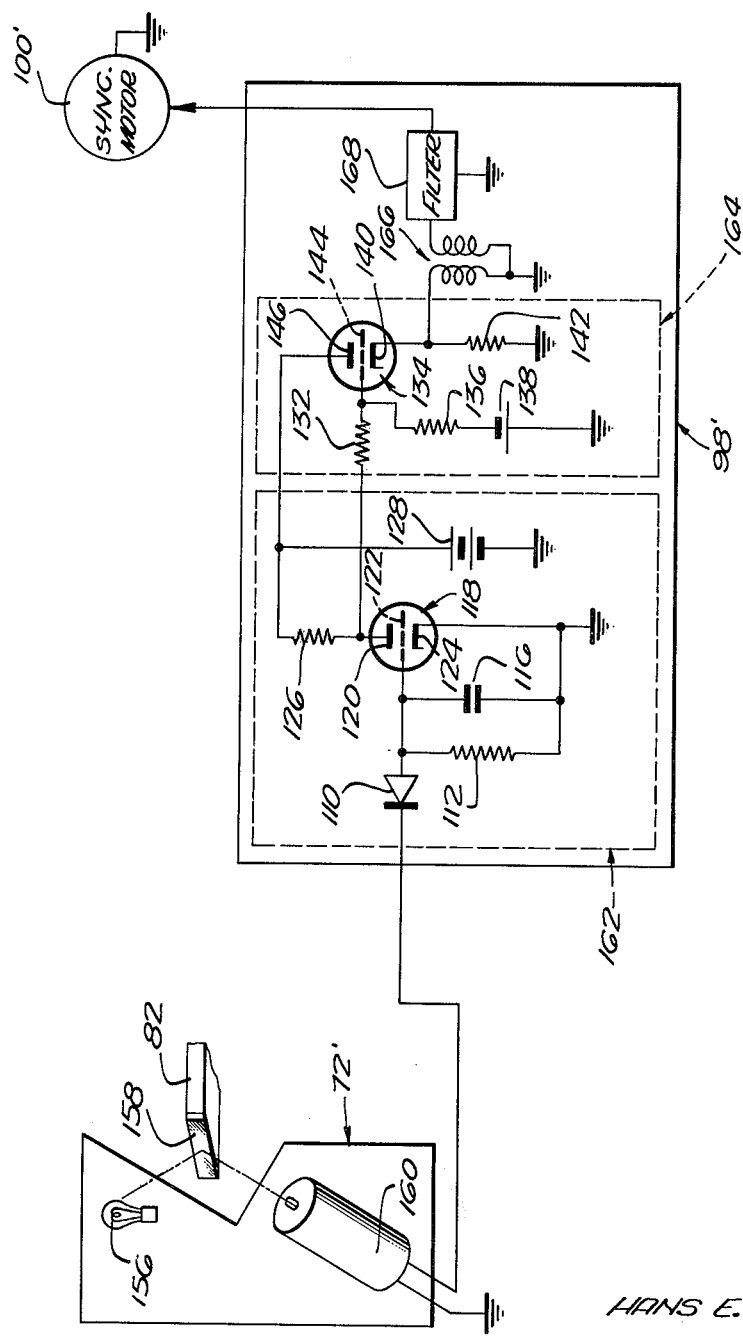
FIG. 7 is a schematic diagram of the flowmeter shown in FIG. 6.

An alternative embodiment of the flowmeter shown in FIG. 1 is shown in FIG. 6, including detector 72', bladed member 80, inner shaft 74, and bearings 76. A modified outer hollow cylindrical shaft 78' is employed which is supported in only one set of ball bearings 88 mounted in single spider 92 that is fixed in a modified dielectric conduit 70'. A modified control circuit 98' is employed to excite stator windings of a conventional synchronous motor 100' to drive shaft 78'. As shown in FIG. 7, detector 72' preferably comprises a lamp 156 to illuminate preferably a light reflecting edge 158 of blades 82 of bladed member 80. Light deflected from blades 158 is received by a photocell 160 that impresses its output on control circuit 98'. Control circuit 98' includes an amplifier 162 which is identical with amplifier 104 shown in FIG. 5 with the exception that a bias battery 114 has been eliminated as unnecessary due to the reverse connection of diode 110. A cathode follower 164 is also employed in control circuit 98' which is identical with cathode follower circuit 130 shown in FIG. 5. The output of cathode follower circuit 164 is impressed upon a transformer 166, the output of which is connected to synchronous motor 100' through a filter 168. Filter 168 simply filters out harmonics of the fundamental frequency of the output signal of cathode follower circuit 64, whereby motor 100' can be a conventional synchronous motor. The rotor of this motor then may include permanent magnets fixed to shaft 78'. The stator of motor 100' may be fixed to housing 170 which is fixed to conduit 70'.

The flowmeters of FIGS. 1 and 6 operate in such a manner that shafts 78 and 78' are driven at a "slaved" rate with respect to inner shaft 74.

It is to be noted that in an ideal flowmeter, bladed member 80 should rotate at exactly the speed of fluid flowing in conduits 70 or 70'. This is performed by the invention because, although some torque is required to turn bladed member 80, since outer shafts 78 and 78' are driven at the same rate as inner shaft 74, the amount of torque required to rotate bladed member 80 can be reduced to any desired amount simply by increasing the gain of amplifier 104 or amplifier 162 to a substantial extent. Thus, since the torque required to rotate bladed member 80 may be reduced to an insignificant value, flowmeters constructed in accordance with the invention will have unusually high accuracy.

It is to be noted that in the flowmeter of the invention, the member having the blades with the greatest pitch may have a number of blades which is either a multiple or submultiple of the poles of the motor when motor excitation is determined by passage of the blades contiguous to the blade position detector means. In such a case, the discrepancy between the number of blades and number of poles may be taken care of by a frequency divider or multiplier or by gear reduction. Response time may be shortened by operating a 400 or 4000 cycle per second alternating current source for the synchronous type motor. For example, if the source is an x40 frequency multiplier responsive to bladed member rotation and 10 blades are employed, a 1:40 gear reduction must be made from the motor output shaft to the flowmeter.

Thus, the synchronous-type motor rotor must have a number of poles or diameter variations equal to $an$ where $$a = \frac{2}{n} \text{ or } \frac{3}{n} \ldots \frac{K}{n}$$

where $n$ is the number of blades of the bladed member and $K$ is any positive integer greater than unity.

Figure 8:
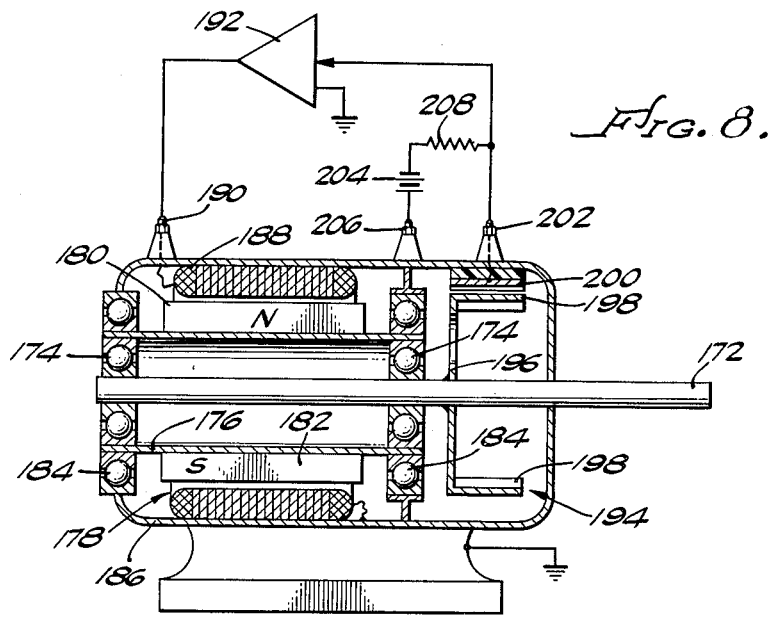
FIG. 8 is a longitudinal sectional view of another embodiment of the invention.

In FIG. 8, an integrator of a different type made in accordance with the invention is illustrated, including an input shaft 172 which is rotatable in ball bearings 174 that in turn are mounted in a cylindrical rotor 176 of a synchronous motor 178. A synchronous motor 178 is provided with permanent magnet north and south poles 180 and 182, respectively, fixed to the cylindrical body 176. Body 176 is rotatably mounted in bearings 184 on the housing 186 of the integrator. The synchronous motor 178 also includes a stator winding 188 that is mounted in housing 186 and is provided with an input terminal 190 which is connected from the output of an amplifier 192. Amplifier 192 receives an input signal from a capacitive signal generator 194 including a spider 196 fixed to input shaft 172. Spider 196 is provided with conductive members 198 that are grounded to the housing 186 by virtue of their electrical as well as their mechanical connection to the metal of spider 196 and input shaft 172.

A metal plate 200, which is maintained in a fixed position, is connected to an input terminal 202 that, in turn, is connected to the positive side of a battery 204 through resistor 208. The other side of battery 204 is connected to a terminal 206. Rotation of shaft 172 thus changes the capacitance between plate 200 and the plates 198 on spider 196. Terminal 202 is connected to the input of amplifier 192. The cylindrical body 176 of synchronous motor 178 is "slaved" to the rotation of input shaft 172 by means exactly analogous to the control circuits 98 and 98' shown in FIGS. 5, and 7, respectively. That is, the pulsations due to a change in capacitance between the plates 200 and 198 are amplified by amplifier 192 and these amplified pulsations are applied to the stator winding 188 of synchronous motor 178 to cause a synchronous motor alignment of cylindrical body 176 at the same frequency and in the same sequence as the pulsation generated. Hence, rotation of cylindrical body 176 is "slaved" to input shaft 172 and rotation of input shaft 172 in bearings 174 is substantially eliminated.

The embodiment of the invention shown in FIG. 11 is unidirectional. That is, due to the fact that a direct-current motor is used, the device will operate satisfactorily only when input shaft 240 is turned in one direction. This is due, of course, to the fact that rotation of shaft 240 in either direction will cause balls 262 of device 238 to distend radially outwardly from the axis of input shaft 240. The device of FIG. 11 therefore is not direction sensitive. Input shaft 240 is rotatably mounted in bearing 260 inside housing 214. When the speed of input shaft 240 exceeds a certain predetermined speed, the right end of lead 228 will become electrically connected to a lead 264 by means of contact of ring 230 with a ring 266. Lead 264 is then electrically connected to slip ring 242. This closes the circuit from the positive terminal battery 248 through brush 244, slip ring 242, conductor 264, ring 266, ring 230, lead 228, brush 226, stator winding the latter being fixed to a left ring 272 of device 238. A spring 274 is employed to bias spiders 276 and 278 of device 236 apart while balls 234 tend to pull them together when they are rotated with housing 214. Body 268 is slidable through a partition 280 of housing 214. A ring 282 of device 236 is fixed to partition 280 as well as to spider 278, spider 276 being fixed directly to body 268. Device 238 is provided with spiders 284 and 286 to support the balls 262. Spider 284 is connected to disc 272 which is slidable upon body 268. Spider 286 is fixed to input shaft 240 through a ring 288. Body 268 is slidable in a bore 290 of input shaft 240. Ring 272 is biased against ring 288 by means of a spring 292.

Thus, in operation, when devices 236 and 238 rotate at the same speed, a space will exist between rings 230 and 266. When the speed of input shaft 240 increases beyond that of housing 214, device 238 will carry the conductive ring 266 in contact with ring 230 and direct-current motor 250 will be energized to increase the angular velocity of housing 214.

Still another embodiment of the invention is illustrated in FIGS. 12, 13, 14 and 15. In particular, in FIG. 12, a base is indicated at 294 for two D'Arsonval type instruments indicated at 296 and 298. Instrument 296 includes a permanent horseshoe magnet 300 in which an armature 302 is rotatably mounted in bearings 304 inside a hollow tubular rotor 306 of instrument 298, rotor 306 including an armature winding 308 inside of a permanent horseshoe magnet 310. That is, armature winding 302 on a shaft 303 is rotatably mounted in bearings 304. Base 294 has a cylindrical appendage 294' which encircles bearings 312 which are employed to rotatably mount elongated hollow shaft 306.

A disc 314 is fixed to the end of winding 308 to which a needle 316 is fixed. A meter plate 318 is then fixed to the right end of apparatus having indicia 320 thereon to indicate the current measured by the instrument 296. Plate 318 is provided with a bore 322 to conform to the hollowed out cylindrical shape 324 of horseshoe permanent magnet 310, as indicated schematically in FIG. 15. Current is supplied to winding 308 to eliminate any substantial mechanical angular displacement of shaft 303 relative to rotor 306 because, as shown in FIG. 14, the left end of shaft 306 as viewed in FIG. 12 carries a metal plate P to change the frequency of a radio-frequency oscillator in a control circuit O by loading an oscillator tank circuit coil C. The operation of circuit O is the same as that illustrated and described in U.S. Reissue Patent No. 24,267 between metal vane 9, coil 10, and meter output leads 28 for circuit C. An amplifier A is employed to amplify the direct-current output of circuit O and impress it on winding 308.

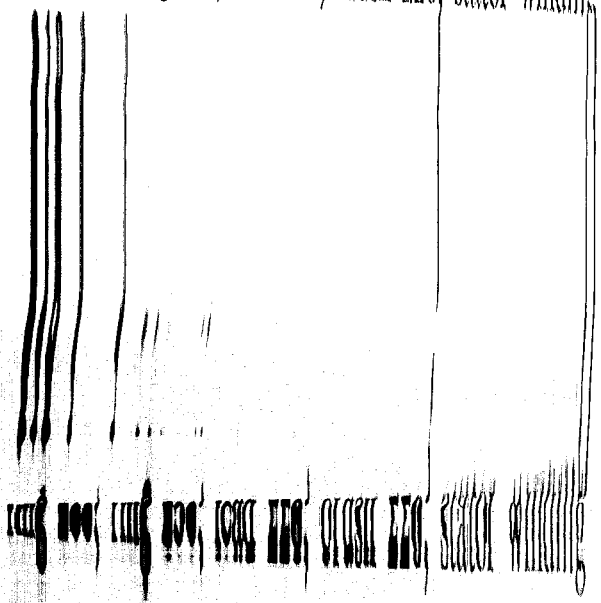

What is claimed is:

1. A flowmeter comprising: fixed support means; a hollow cylinder; outer bearing means to support said hollow cylinder rotatably from said support means; a shaft; inner bearing means to support said shaft rotatably inside said hollow cylinder; a bladed member having a predetermined pitch fixed to said shaft in a position to rotate upon fluid flow in an axial direction thereagainst; a ferromagnetic rotor fixed to said hollow cylinder having a number of variations of radius equal to $an$ where $$a = \frac{2}{n} \text{ or } \frac{3}{n} \ldots \text{ or } \frac{K}{n}$$

$n$ is the number of blades of said bladed member, and $K$ is any positive integer greater than unity; means on said support means at a first fixed point around said bladed member to generate an electrical output pulse when a blade of said bladed member passes said first fixed point; and a coil on said support means at a second fixed point around said rotor connected to said pulse generator means for rotating said rotor in a manner similar to that in which a synchronous motor rotor is driven.

2. The invention as defined in claim 1, wherein the blades of said bladed member are made of a ferromagnetic material and wherein said pulse generator means includes a coil positioned to have its inductive reactance changed by rotation of a blade of said bladed member past said first fixed point.

3. The invention as defined in claim 1, wherein said pulse generator means includes a lamp to illuminate an end of the blades of said bladed member and photocell to receive light reflected from the blades of said bladed member upon the movement thereof past said first fixed point.

4. A flowmeter comprising: fixed support means; a hollow cylinder; outer bearing means to support said hollow cylinder rotatably from said support means; a shaft; inner bearing means to support said shaft rotatably inside said hollow cylinder; a first bladed member having a predetermined pitch fixed to said shaft in a position to rotate upon fluid flow in an axial direction thereagainst; a second bladed member fixed to said cylinder having a pitch less than that required to rotate it synchronously with said first bladed member during axial fluid flow, said second bladed member having a number of blades equal to $an$ where $$a = \frac{2}{n} \text{ or } \frac{3}{n} \ldots \text{ or } \frac{K}{n}$$

$n$ is the number of blades of said first bladed member, and $K$ is any positive integer greater than unity; means on said support means at a first fixed point around said first bladed member to generate an output pulse when a blade of said first bladed member passes said first fixed point; and a coil on said support means at a second fixed point around said second bladed member connected to said pulse generator means for rotating said second bladed member in a manner similar to that in which a synchronous motor rotor is driven.

5. An integrator comprising: fixed support means; a synchronous motor including a hollow rotor shaft rotatably carried on said support means, said rotor having a magnet thereon, said motor also having a stator winding fixed to said support means; an input shaft rotatably carried in the space inside said hollow motor rotor; a spider fixed to said input shaft having a plurality of radially extending metal members; a metal member fixed to said support means; and means responsive to a change in capacitance of a predetermined frequency between said fixed member and said spider upon rotation of said input shaft to apply voltage pulses to said stator winding at the same frequency as said predetermined frequency.

6. A flowmeter comprising: fixed support means; a hollow cylinder; outer bearing means to support said hollow cylinder rotatably from said support means; a shaft; inner bearing means to support said shaft rotatably inside said hollow cylinder; a bladed member fixed to said shaft in a position to rotate upon fluid flow in an axial direction thereagainst; means on said support means adjacent said bladed member for generating an electrical signal that pulsates with the speed of the bladed member; drive means for said hollow cylinder; means between said pulse generating means and said drive means for the controlling of said drive means whereby the drive means rotates in synchronism with the bladed member.

7. Apparatus, as described in claim 6, wherein, said generating means includes a blade fixed to said bladed member having a predetermined pitch to rotate upon fluid flow in an axial direction of said bladed member, said blade being constructed at least partially of a magnetic material, and a coil disposed at a fixed point adjacent said one member, said coil changing reactance as said blade rotates past said fixed point to produce said pulsing electrical signal.

8. Apparatus, as described in claim 6, wherein, said generating means includes a blade fixed to said bladed member having a predetermined pitch to rotate upon fluid flow in an axial direction of said bladed member and a light source directing a beam of light toward said blade and a photoresponsive means disposed to receive a light variation as the said blade cuts said light beam to produce said pulsing electrical signal.

9. Apparatus, as described in claim 6, wherein, said generating means includes a radial extension fixed to said bladed member constructed at least partially of a conductive metal and a conductive member disposed at a fixed point adjacent said bladed member to cooperate with said extension to form two plates of a capacitor with a capacitance that varies as said extension rotates past said fixed point to produce said pulsing electrical signal.

References Cited in the file of this patent

UNITED STATES PATENTS

| 1,790,864 | Holtz | Feb. 3, 1931 |
| 2,355,921 | Mercier et al. | Aug. 15, 1944 |
| 2,983,556 | Coan | May 9, 1961 |

FOREIGN PATENTS

| 803,069 | Great Britain | Oct. 15, 1958 |